June 16, 1936.                F. H. CLICKNER                2,044,282
                            MANUFACTURE OF CASEIN
                            Filed Sept. 28, 1933           3 Sheets-Sheet 1

Inventor
Forest H. Clickner.

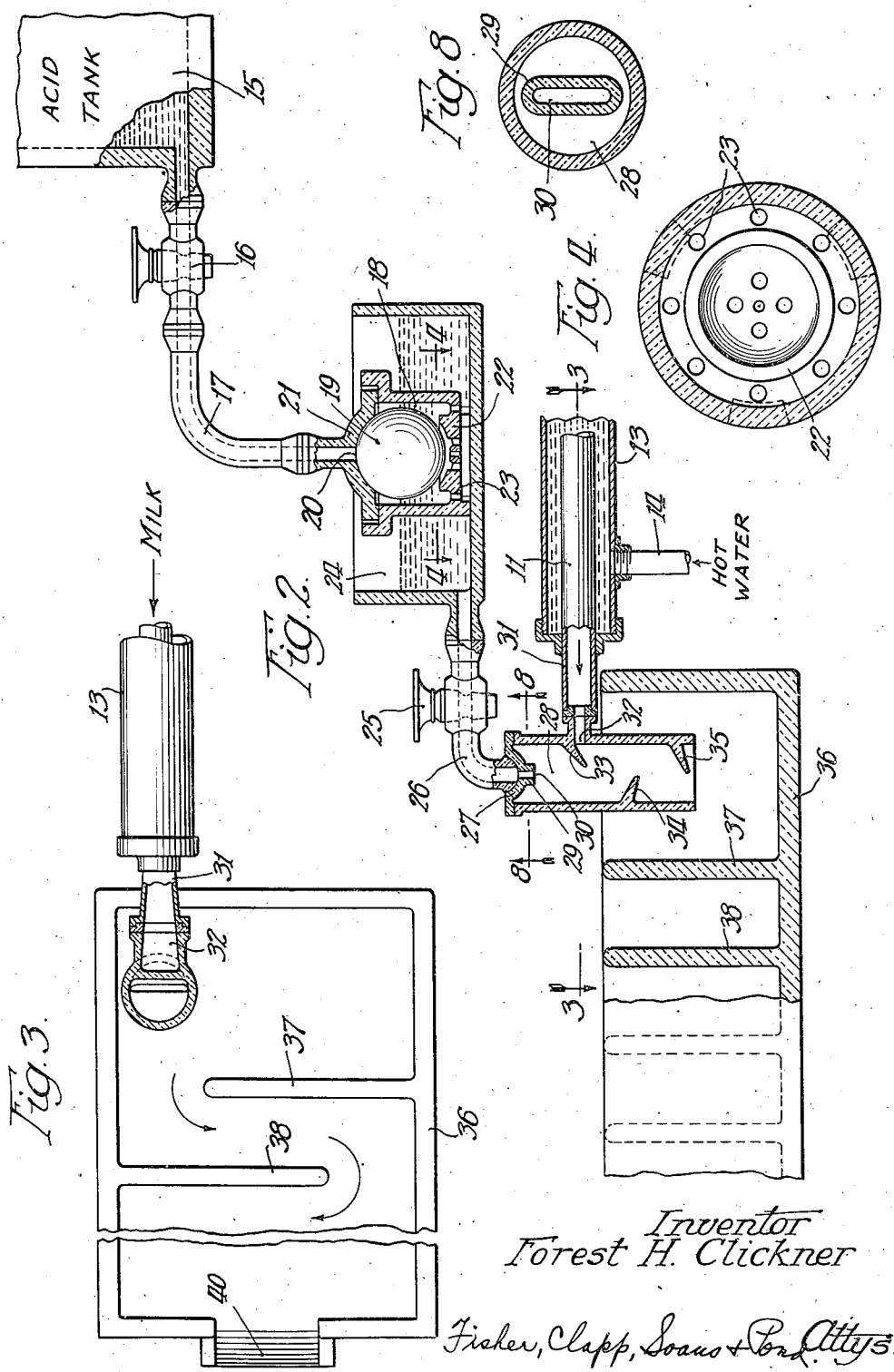

June 16, 1936.  F. H. CLICKNER  2,044,282
MANUFACTURE OF CASEIN
Filed Sept. 28, 1933  3 Sheets-Sheet 3
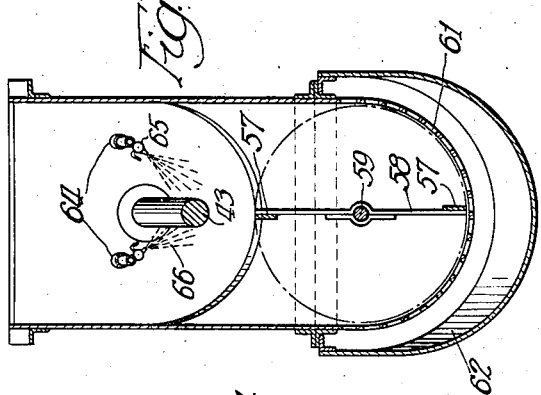
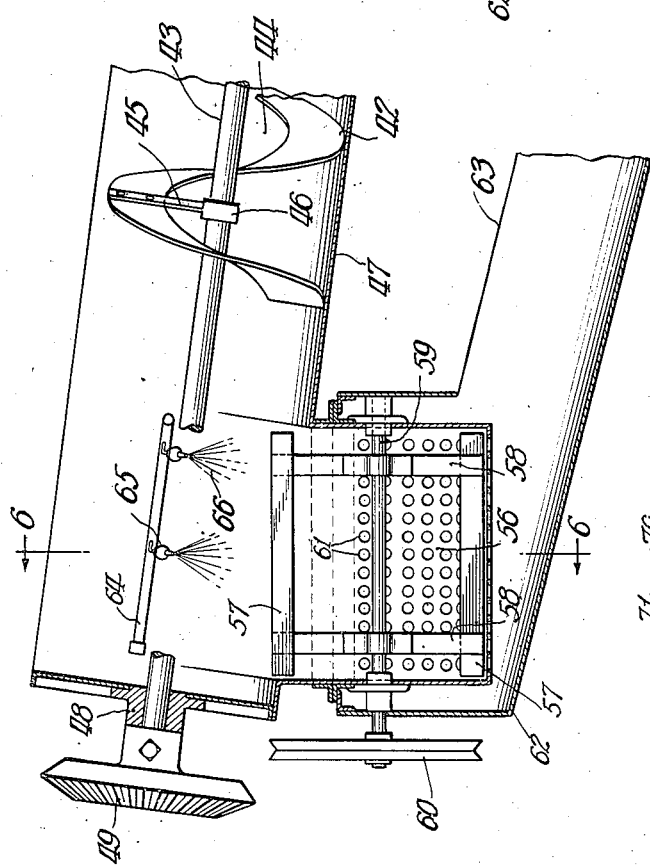
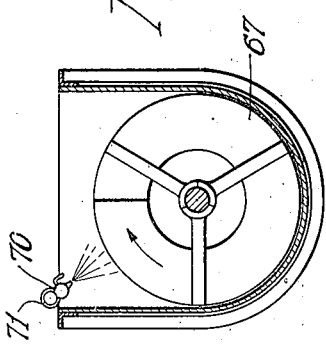
Inventor
Forest H. Clickner
Fisher, Clapp, Soans & Pond, Attys.

Patented June 16, 1936

2,044,282

UNITED STATES PATENT OFFICE 2,044,282

MANUFACTURE OF CASEIN

Forest H. Clickner, Chicago, Ill., assignor to Kraft-Phenix Cheese Corporation, Chicago, Ill., a corporation of Delaware Application September 28, 1933, Serial No. 691,369

4 Claims. (99—20)

The invention relates to the manufacture of casein and has its chief application when used in the making of casein having characteristics such as are required for the manufacture of transparent films or sheets, in which such articles as cigars, candy, etc., may be wrapped or packaged.

The object of the invention is to provide an efficient and economical process for the manufacture of high-grade casein suitable for the purpose indicated.

I have found that casein, in order to be successfully used in the making of such films and sheets, should be substantially free from calcium salts. All commercial caseins which I have examined and tested up to the present time, contain an objectionable percentage of calcium salts and it is difficult, if not impossible, to remove these calcium salts by any process so far described in the literature without at the same time impairing the natural qualities of the casein.

Casein which is purchasable on the open market, is made by subjecting milk to the action of an acid. This acid may be lactic acid due to a natural souring of the milk, or it may be produced by the action of rennet upon the milk, or it may be a mineral acid, hydrochloric acid being the acid principally employed. The invention herein disclosed is especially adapted for use in connection with the mineral acid process.

The drawings accompanying this application disclose a preferred type of apparatus or equipment by the aid of which my improved process can be efficiently and economically practiced.

In these drawings—

Fig. 2 is an enlarged vertical section of the acid mixing arrangement disclosed in Fig. 1.

Fig. 3 is a section taken on the line 3—3 of Fig. 2.

Fig. 4 is a section taken on the line 4—4 of Fig. 2.

Fig. 5 is an enlargement of the left-hand end of the upper conveyor and associated apparatus shown in Fig. 1.

Fig. 6 is a section taken on the line 6—6 of Fig. 5.

Fig. 7 is a section taken on the line 7—7 of Fig. 1, and

Fig. 8 is a section taken on the line 8—8 of Fig. 2.

Figure 1:
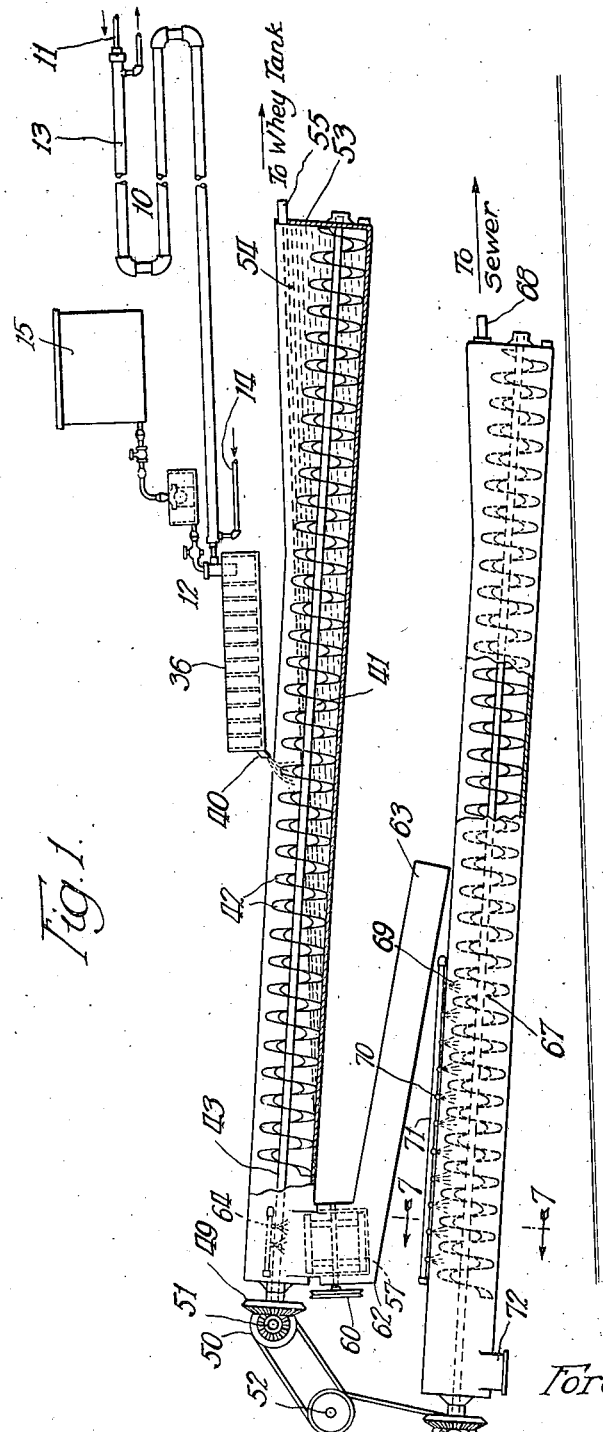
Fig. 1 is an elevation of the principal parts of the apparatus, certain parts being shown in section.

The apparatus shown herein embodies certain features of the equipment disclosed in the Shaffield Patent No. 1,716,799, and the present invention is in the nature of an improvement or adaptation of the process and apparatus described in said patent.

I have secured very good results with the following process.

Fresh milk as it comes from the cows is separated so as to remove the fat or butter, but it is preferably not pasteurized as I find that raising the temperature of the milk to a pasteurizing temperature has a tendency to denature the proteins and makes the casein gummy or sticky. This gumminess or stickiness in the casein has a tendency to cause conglomerization of the particles of casein which interferes with the process. In fact, it is better throughout the process to prevent the temperature of the milk from at any time exceeding 100° F. It is desirable, however, to have the temperature during the acid mixing stage as high as possible without exceeding the danger point, otherwise, the reaction will be undesirably slow and the yield will be reduced.

In order to obtain the desired temperature of 110° F. without at the same time overheating any of the particles of casein, I prefer to use a counter-flow water-jacketed arrangement which, in effect, is a reversed milk cooler of the pipe water-jacket type. Such a heater is somewhat diagrammatically shown in the drawings by the numeral 10. It consists of a central pipe 11, through which the milk is conducted to the mixing apparatus designated as a whole 12. Said pipe 11 is enclosed in a larger pipe or jacket 13 which receives a supply of circulating water through the feed pipe 14. The water which is introduced through the pipe 14 is of sufficient volume, and the lengths of the pipes 11 and 13 in comparison with the flow of milk through pipe 11 are sufficient so that it is not necessary to use a temperature of more than about 114° F. for the feed water so as to raise the temperature of the milk to 110° F. by the time it reaches the mixing apparatus 12. Obviously, in order to effect such result with such a small temperature difference, it will be necessary to circulate the feed water through pipe 14 at a rate of flow several times that of the rate of flow of the milk through the pipe 11. The feed water may be heated in any convenient manner and in order to save heat, it is preferably re-circulated through such heating means.

The acid tank 15 is kept supplied with commercial hydrochloric acid which has been diluted by the addition of eight times as much water. This dilute acid is conducted through a cock 16 and pipe 17 to the interior of a float chamber 18, said float chamber containing a ball float 19, which, when the ball is raised, seals the delivery orifice 20 in the dome 21 into which the pipe 17 discharges. The lower wall or bottom 22 of the float chamber is provided with a series of apertures as at 23 which allows a free flow of acid from the interior of the float chamber 18 into the surrounding acid well 24. It will be manifest that with the arrangement just described, the level of acid in the acid well 24 will be maintained at a uniform height.

From the acid well 24, the acid is conducted through an adjustable valve 25 to a downwardly directed elbow 26 which is united to the upper end 27 of the vertical mixing chamber 28. The top wall 27 of said mixing chamber 28 has a depending nipple 29 in which there is an elongated aperture or slot 30 which communicates with the aperture and the lower end of the elbow 26, so that the acid flows down through the center of the mixing chamber 28 in the form of a narrow, thin, ribbon-like stream.

The delivery end 31 of the milk pipe is connected into the side of the mixing chamber 28 and delivers its milk through a delivery opening 32 which is relatively narrow in height compared to its horizontal width. Immediately above the delivery opening or slot 32, there is formed in the wall of the mixing chamber 28 a downwardly directed inclined baffle 33, the lower point of which extends below the center line of the slot 32, so that when the milk passing out of the slot 32 strikes the inclined lower edge of the baffle 33, it will be directed downwardly and at the proper angle to impinge upon the ribbon of acid descending from the acid delivery slot 30. Other baffles 34 and 35 are employed for the purpose of still further mixing up the acid and the milk. As a matter of fact, in practice I find that when the mixture of milk and acid has dropped out of the bottom of the mixing chamber 28, the reaction in a large measure is complete.

The mixture, which at that time consists substantially of a somewhat acid whey solution containing a finely divided grain curd, drops from the mixing chamber into the head end of a flow box 36, in which there are arranged a series of alternately oppositely disposed staggered baffles as shown at 37 and 38.

From the flow box 36, the mixture or solution is delivered by a spout 40 to about the middle point of an inclined screw conveyor designated as a whole 41. As shown best in Fig. 5, said screw conveyor 41 comprises a continuous worm 42 in the form of a spiral ribbon, the inner edge of the spiral being spaced a substantial distance from the shaft 43 so as to provide a continuous opening 44 extending from end to end of the conveyor. The mounting of the ribbon 42 on the shaft 43 is effected by means of a series of spaced radial arms as indicated at 45, which are fixedly secured in suitable bosses 46 rotating with the shaft 43. The casing 47 as to its lower half is of the proper shape and dimensions to fit closely around the worm 42. The upper end of the propeller shaft 43 is supported in a bearing 48 and is rotated by a pair of bevel gears 49 and 50, the bevel gear 50 being keyed to a shaft 51 which is driven by a chain in sprockets from the main power shaft 52.

The lower end wall 53 of the screw conveyor casing and the side walls 54 thereof, are extended upwardly a substantial distance above the top of the worm at the lower end of the conveyor so as to maintain the body of liquid in the casing at such level that its upper surface extends to a point between the spout 40 and the upper end of the conveyor. An overflow pipe 55 in the top portion of the lower end wall 53 of the casing conducts the clear whey to a suitable storage tank, not shown.

At its upper end, as shown best in Fig. 5, the lower wall of the conveyor casing 47 is cut away so as to provide a rectangular opening which delivers the grain curd into a semi-cylindrical beater chamber 56. Within said beater chamber 56, there is a pair of bars or beaters 57 on the ends of a pair of arms 58 fixed on a horizontal beater shaft 59, suitably supported co-axially in and with the cylinder 56. The shaft 59 is supported in suitable bearings and is rotated at the desired speed by a pulley 60 driven by a suitable source of power, not shown. The semi-cylinder 56 is made with a series of perforations 61 providing a screen effect, so that when the material has been sufficiently comminuted or disintegrated by the revolving beater arms 57, it will fall into a semi-cylindrical casing 62, forming a part of the upper end of a delivery spout or chute 63.

Above the aperture which connects the upper end of the screw conveyor 41 to the beater chamber 56, there are arranged on either side of and slightly above the conveyor shaft 43, a pair of clear water pipes 64, provided with adjustable nozzles 65 which direct sprays of clear water 66 onto the material into the beater chamber 56.

The grain curd is delivered by the spout 63 to about the middle point of a second screw conveyor 67, having substantially the same characteristics as to construction and operation as the screw conveyor 41, except that the level of liquid in the conveyor 67 does not extend so far up the incline. From the lower end of the conveyor 67, the wash water is conducted to the sewer by a waste pipe 68. As the granulated curd is moved up the inclined casing of the screw conveyor 67, it is subjected to the action of a series of sprays of water 69 from a line of spray heads 70 fitted in the clear water supply pipe 71, which serves thoroughly to wash the material as it travels up the incline. The upper end of the conveyor is provided in its lower wall with a delivery spout 72.

The rate of flow of the acid treated milk, and the dimensions of the serpentine flow box 36, and parts of the conveyor 41, and the effective speed of the conveyor 41, are such that the grain curd remains in the bath of whey for from ten to twenty minutes. This bathing of the grain curd in the whey is an important feature because it insures that the casein will reach its iso-electric point. I have found that this is very desirable in order to insure against the casein containing soluble calcium salts which, if present, would result in the formation of pin holes or brittleness in a film made from such casein. On the other hand, if the casein remains in the whey for too long a time, it is difficult to wash out all of the whey and thus prevent whey sugar contamination. The best results, so far as the final product is concerned, appear to be obtained when the casein after drying and milling has an average pH of from 4.63 to 4.67. It is understood that the flow of acid through the acid valve 16 must be in sufficient excess so that there is enough acid in the whey bath to permit the required absorption or penetration of acid into the casein particles, otherwise the finished material after drying and milling will not have the required pH value. However, if the final pH value is below the range specified, it will be necessary to add alkali which is undesirable from the standpoint of brittleness in the film to be manufactured or cast from such casein.

The thoroughly washed grain curd as soon as it is discharged from the delivery spout 72 is dried and milled, i. e. comminuted in the usual manner. The drying may be effected, for example, in a casein tunnel at a progressively increasing temperature until the moisture has been reduced to 6% or less.

Changes may be made in the described embodiment without departing from the spirit of the invention, the scope of which should be determined by reference to the following claims, said claims being construed as broadly as possible, consistent with the state of the art.

I claim as my invention:

1. The improvement in the art of separating casein from milk which consists in heating unpasteurized skim milk by counter flow means so that no portion thereof is raised above about 110° F., quickly and intimately mixing with said milk a supply of mineral acid so as to produce a finely divided grained curd, bathing the curd in its whey so as to give time for the acid in the whey to penetrate to the interior of the granules and bring all of the casein to its iso-electric point, but before there has been any material sugar contamination, then separating the whey from the curd, washing the curd and drying the same.

2. The improvement in the art of manufacturing dry casein, which consists in quickly and intimately mixing together two continuous streams of mineral acid with fresh, (i. e. unpasteurized) skimmed milk which has been heated to counter-flow means to about 110° F. without raising any portion of said milk to substantially above said temperature so as to produce a finely divided grained curd, bathing while agitating the curd in its whey for between ten and twenty minutes so as to give time for the acid in the whey to penetrate to the interior of the granules and bring all of the casein to its iso-electric point, but before there has been any material sugar contamination, then immediately separating the whey from the curd, washing the curd and drying the same so as to reduce the moisture to about 6% or less.

3. The improvement in the art of manufacturing dry casein which consists in quickly and intimately mixing together two continuous streams of mineral acid with fresh, (i. e. unpasteurized) skimmed milk which has been heated to about 110° F. by counter-flow means, whereby substantially none of said milk has been overheated so as to produce a finely divided grained curd, there being present enough acid to produce a distinctly acid whey condition, bathing while agitating the curd in its whey so as to give time for the acid in the whey to penetrate to the interior of the granules and bring all of the casein to its iso-electric point, but before there has been any material sugar contamination, then separating the whey from the curd, washing the curd and drying the same.

4. The improvement in the art of making casein having a pH of from 4.63 to 4.67, from milk which consists in quickly and intimately mixing together two continuous streams of mineral acid with fresh, (i. e. unpasteurized) skimmed milk which has been heated to about 110° F. by counter-flow means, whereby substantially none of said milk has been over-heated so as to produce a finely divided grained curd, there being an excess of acid so that the resulting whey will be distinctly acid, bathing while agitating the curd in said acid whey for between ten and twenty minutes so as to give time for the acid in the whey to penetrate to the interior of the granules and bring all of the casein to its iso-electric point, but before there has been any material sugar contamination, then immediately separating the whey from the curd, washing the curd and drying the same so as to reduce the moisture to about 6% or less.

FOREST H. CLICKNER.